United States Patent
Klauer et al.

(10) Patent No.: US 9,016,211 B2
(45) Date of Patent: Apr. 28, 2015

(54) WHEELSETS FOR RAIL VEHICLES OR PARTS OF WHEELSETS FOR RAIL VEHICLES AND METHOD FOR COATING

(75) Inventors: Jens Klauer, Hamburg (DE); Egon Warntjes, Oldenburg (DE); Klaus Buck, Langen (DE); Eugen Hoegele, Alzey (DE); Achim Gast, Sendenhorst (DE)

(73) Assignee: BASF Coatings GmbH, Munster (DE)

( * ) Notice: Subject to any disclaimer, the term of this patent is extended or adjusted under 35 U.S.C. 154(b) by 0 days.

(21) Appl. No.: 14/116,929

(22) PCT Filed: May 10, 2012

(86) PCT No.: PCT/EP2012/058650
§ 371 (c)(1),
(2), (4) Date: Jan. 24, 2014

(87) PCT Pub. No.: WO2012/152870
PCT Pub. Date: Nov. 15, 2012

(65) Prior Publication Data
US 2014/0290527 A1    Oct. 2, 2014

Related U.S. Application Data

(60) Provisional application No. 61/484,274, filed on May 10, 2011.

(30) Foreign Application Priority Data

May 10, 2011    (EP) .................................... 11165574

(51) Int. Cl.
*B61F 5/50* (2006.01)
*C08G 18/32* (2006.01)
*C08G 18/36* (2006.01)
*C08G 18/66* (2006.01)
*C09D 175/14* (2006.01)
*C08K 3/22* (2006.01)
*C08K 5/52* (2006.01)

(52) U.S. Cl.
CPC ............... *B61F 5/50* (2013.01); *C08G 18/324* (2013.01); *C08G 18/36* (2013.01); *C08G 18/6696* (2013.01); *C08K 3/22* (2013.01); *C08K 5/52* (2013.01); *C09D 175/14* (2013.01)

(58) Field of Classification Search
USPC ...................... 105/182.1; 427/388.1; 524/236
See application file for complete search history.

(56) References Cited

U.S. PATENT DOCUMENTS

| | | | |
|---|---|---|---|
| 2009/0036561 A1* | 2/2009 | Nygren ........................ | 521/84.1 |
| 2010/0175583 A1* | 7/2010 | Roschmann et al. ...... | 106/14.42 |

FOREIGN PATENT DOCUMENTS

| | | |
|---|---|---|
| DE | 4320549 C1 | 7/1994 |
| EP | 0568388 A1 | 11/1993 |
| WO | WO2007050000 A1 | 5/2007 |

OTHER PUBLICATIONS

International Preliminary Report on Patentability for International Application No. PCT/EP2012/058650 issued Nov. 12, 2013, 5 pages.
International Search Report for International Application No. PCT/EP2012/058650 mailed Sep. 6, 2012, 3 pages.
Written Opinion for International Application No. PCT/EP2012/058650 mailed Sep. 6, 2012, 5 pages.

* cited by examiner

*Primary Examiner* — John Uselding
(74) *Attorney, Agent, or Firm* — Cantor Colburn LLP

(57) ABSTRACT

Disclosed are wheelsets having a cured coating produced from the application and curing of a composition comprising a component A comprising a1) 18 to 30% by weight of a polyether polyol with a hydroxy number of 300 to 500 mg KOH/g, a2) 38 to 60% by weight of castor oil, a3) 0.6 to 2.0% by weight of at least one di- or polyamine, a4) 5.6 to 9.0% by weight of trizinc bis(orthophosphate), a5) 2.2 to 3.5% by weight of zinc oxide and/or zinc phosphate, a6) 0.05 to 0.4% by weight of a catalyst which catalyzes urethane formation, where the percentage by weight data are based on the total mass of the coating composition, and a component B comprising one or more di- and/or polyisocyanates in an amount corresponding to a molar ratio of 0.6:1 to 1.2:1 of the isocyanate groups to the hydroxy groups of the constituents a1) and a2).

15 Claims, No Drawings

WHEELSETS FOR RAIL VEHICLES OR PARTS OF WHEELSETS FOR RAIL VEHICLES AND METHOD FOR COATING

CROSS REFERENCE TO RELATED APPLICATIONS

This application is a National Phase Application of Patent Application PCT/EP2012/058650 filed on 10 May 2012, which claims priority to U.S. 61/484,274 filed 10 May 2011 and EP11165574.2 filed 10 May 2011, of which all aforementioned applications are incorporated by reference herein in their entirety.

FIELD OF THE INVENTION

The present invention relates to a 2-component polyurethane coating material for coating wheelsets for trackbound vehicles or parts of these.

BACKGROUND OF THE INVENTION

Wheelsets of trackbound vehicles must have protection from corrosion. Wheelsets are the wheels and the axles inclusive of the bogies and underframes of the trackbound vehicles. For the purposes of the present invention, wheelsets are preferably the wheels and axles of the trackbound vehicles. In passenger transportation and particularly in high-speed transportation, the abovementioned parts do not only require protection from the effects of weathering but are also subject to high mechanical stress caused by airborne stone fragments and the like. The coatings must therefore be very robust, tough and flexible, in order to avoid damage to the wheelsets by the abovementioned airborne stone fragments. It is known that 2-component polyurethane compositions can be applied to the wheelsets for impact protection (5th Technical conference on ZfP im Eisenbahnwesen [Non-destructive testing in the rail transport industry], 4-6 Mar. 2008, Wittenberge). The applied thickness of the impact-protection coatings disclosed therein is at least 6 mm.

Particularly relevant factors in freight transport, on the other hand, are protection from corrosion and from mechanical load. Another requirement in freight transport is that the thermal stability of the coating is visually perceptible. It is moreover desirable that the coating reduces noise.

Since the coatings known hitherto do not exhibit satisfactory results, it is an object of the present invention to provide a further improvement in the protection provided by coatings of this type from corrosion and from impact. Another particular intention is to permit ultrasound testing of the wheelsets through the coating.

SUMMARY OF THE INVENTION

The abovementioned objects are achieved in wheelsets and parts thereof of the type mentioned in the introduction in that the coating was produced by applying a coating composition which comprises the following constituents, and reacting this composition to completion:
component A comprising
a1) from 18 to 30% by weight of a polyether polyol with a hydroxy number of from 300 to 500 mg KOH/g, preferably 320 to 450 mg KOH/g, and particularly preferably 360 to 400 mg KOH/g, determined to ASTM D1209,
a2) from 38 to 60% by weight of castor oil,
a3) from 0.6 to 2.0% by weight of at least one di- or polyamine, preferably at least one aromatic diamine, and particularly preferably diethyltoluenediamine,
a4) from 5.6 to 9.0% by weight of trizinc bis(orthophosphate),
a5) from 2.2 to 3.5% by weight of zinc oxide and/or zinc phosphate, preferably zinc oxide,
a6) from 0.05 to 0.4% by weight of a catalyst which catalyzes urethane formation, where the percentage by weight data are based on the total mass of the coating composition,
and
as component B, one or more di- and/or polyisocyanates in an amount which corresponds to a molar ratio of from 0.6:1 to 1.2:1, preferably from 0.7:1 to 1.1:1, particularly preferably from 0.8:1 to 1.1:1, and very particularly preferably from 0.9:1 to 1.1:1 of the isocyanate groups to the hydroxy groups of the constituents a1) and a2).

DETAILED DESCRIPTION OF AN EMBODIMENT OF THE INVENTION

The polyether polyol a1) involves polyols of this type with the OH number mentioned with hydroxy-group functionality of at least 2, preferably from 2 to 6, particularly preferably from 2 to 4, and very particularly preferably about 3.

These materials preferably involve ethylene-oxide- and/or propylene-oxide-, particularly preferably only propylene-oxide-alkoxylated polyalcohols with corresponding functionality. It is very particularly preferable that the polyalcohols involve trimethylolpropane or glycerol, in particular glycerol.

In one preferred embodiment, the compound a2) involves castor oil with an OH number of more than 150 mg KOH/g, particularly preferably at least 160 to 180 mg KOH/g, and very particularly preferably 160 to 168 mg KOH/g.

For the purposes of the present document, castor oil here preferably means a mixture composed predominantly, i.e. to an extent of at least 50% by weight, preferably to an extent of at least 60% by weight, and particularly preferably to an extent of at least 75% by weight, of at least partially, preferably fully esterified acylglycerol, where at least one, and preferably at least two, of the acyl groups thereof involve(s) ricinoleic acid or isoricinoleic acid, preferably ricinoleic acid. The other acyl groups can by way of example involve oleic acid, linoleic acid, palmitic acid, and/or stearic acid.

The compound a3) involves at least one di- or polyamine, preference being given to aromatic diamines as compounds a3), and it is particularly preferable that the materials involve diethyltoluenediamine and/or dimethylthiotoluenediamine, and they very particularly preferably involve diethyltoluenediamine.

It is advantageous that the coating composition optionally comprises, as further constituent a7) of component A, from 14.5 to 17.5% by weight of a copolymer of unsaturated aromatic $C_9/C_{10}$-hydrocarbons with phenol. In one preferred embodiment, this involves copolymers which contain phenol groups and which comprise copolymerized α-methylstyrene. Products of this type are known by way of example with CAS No. [68512-30-1]. Constituent a7) causes hydrophobization of the coating, which further improves corrosion protection and protection from effects of weathering.

It is advantageous that the coating composition optionally comprises, as further constituent a8), from 3.5 to 6.5% by weight of zeolite. The pore width of this constituent is advantageously from 3 to 4 Å, preferably from 3 to 3.5 Å, and particularly preferably approximately 3 Å. It serves as water scavenger and binds small proportions of water in the coating composition.

The coating composition can advantageously optionally comprise from 2.5 to 6.5% by weight of pigments and/or fillers a9). Colorant pigments can provide an attractive appearance to the cured coating compositions. Pigments and fillers also improve the mechanical properties of the cured coating compositions. Pigments that can be used are the usual inorganic or organic pigments used in the coating industry, for example iron oxide, titanium oxide and the like. It is also possible to use carbon black as colorant.

The coating composition can moreover also comprise, as further constituent of component A, from 2 to 2.5% by weight of antifoam and/or leveling assistant a10).

Use of di- and/or polyisocyanates as crosslinking agents in polyurethane compositions is known. It is advantageous in the present invention that crosslinking component B comprises tolylene 2,4- and/or 2,6-diisocyanate (TDI), o-, m-, or p-xylene diisocyanate (XDI), naphthyl 1,5- or 1,8-diisocyanate (ND), or diphenylmethane 2,4- and/or 4,4-diisocyanate, preferably diphenylmethane 2,4- and/or 4,4-diisocyanate, or consists thereof.

The amount of component B used is such that the resultant molar ratio of the isocyanate groups to the hydroxy groups of the constituents a1) and a2) is from 0.6:1 to 1.2:1, preferably from 0.7:1 to 1.1:1, particularly preferably from 0.8:1 to 1.1:1, and very particularly preferably from 0.9:1 to 1.1:1.

This corresponds by way of example to a ratio by weight of component A to component B of from 3:1 to 2:1, preferably about 2.5:1 (in each case in the absence of solvents). Accordingly, in particularly preferred embodiments of the present invention, components A and B are used in a ratio by weight of from 3:1 to 2:1, very particularly preferably about 2.5:1 (in each case in the absence of solvents).

The catalyst a6) present in the coating composition serves to accelerate the reaction of the isocyanate groups with the hydroxy groups. It is advantageous to use catalysts based on tin, zinc, zirconium or bismuth, preferably dibutyltin dilaurate.

The invention also provides a process for coating wheelsets or parts thereof via application and curing of a 2-component polyurethane coating composition. The process according to the invention is characterized in that the coating composition comprises the following constituents: component A comprising a1) from 18 to 30% by weight of a polyether polyol with a hydroxy number of from 300 to 500 mg KOH/g, preferably 320 to 450 mg KOH/g, and particularly preferably 360 to 400 mg KOH/g, determined to ASTM D1209,
a2) from 38 to 60% by weight of castor oil,
a3) from 0.6 to 2.0% by weight of at least one di- or polyamine, preferably at least one aromatic diamine, and particularly preferably diethyltoluenediamine,
a4) from 5.6 to 9.0% by weight of trizinc bis(orthophosphate),
a5) from 2.2 to 3.5% by weight of zinc oxide and/or zinc phosphate, preferably zinc oxide,
a6) from 0.05 to 0.4% by weight of a catalyst which catalyzes urethane formation, where the percentage by weight data are based on the total mass of the coating composition, and
as component B, one or more di- and/or polyisocyanates in an amount which corresponds to a molar ratio of from 0.6:1 to 1.2:1, preferably from 0.7:1 to 1.1:1, particularly preferably from 0.8:1 to 1.1:1, and very particularly preferably from 0.9:1 to 1.1:1 of the isocyanate groups to the hydroxy groups of the constituents a1) and a2).

In one advantageous embodiment of the present invention, at least one adhesion primer is applied to the substrate, preferably the metallic surface, before the two-component polyurethane coating composition according to the invention is applied.

The metallic surface to which the coating composition is applied preferably involves steel which has been turned or abrasive-blasted. An advantage of the coating composition according to the invention is that it exhibits good adhesion on both types of surfaces, but for a surface with surface roughness of no more than 6 micrometers it is preferable to use at least one adhesion primer.

Preferred adhesion primers are those which exhibit good adhesion on turned surfaces, in particular more than 5 Mpa in the adhesion test (tensile detachment test).

The dry layer thickness of the adhesion primer applied is preferably from 20 to 30 μm, and the two-component polyurethane coating composition according to the invention is applied during the time in which the adhesion primer can still be overcoated.

The application of the coating composition according to the invention to the wheelsets preferably takes place in a two-component hot-spraying system, in the stated mixing ratio, with heating of the coating composition to temperatures around 40° C.

After the application process, the reaction of the coating composition is preferably completed at ambient temperature up to 40° C., particularly preferably at from 10 to 30° C. The coating is generally dry to the touch after up to 30 minutes, and transportable after up to 3 hours.

Products of the prior art are often not transportable until they have cured for 24 hours. Additional heating is also required for the curing process at lower temperatures.

Advantageous embodiments of the process according to the invention are found in dependent claims 9 to 14.

The dry film thickness is for example from 1 to 6 millimeters, preferably from 2 to 3 millimeters. The preferred range of dry film thickness of from 2 to 3 millimeters is in particular suitable for applications in freight transport, and in particular coatings are produced with appropriate layer thickness for applications of that type. For passenger transport applications, preference is given to a dry film thickness of more than 3 millimeters.

The invention achieves very good corrosion protection in conjunction with high mechanical strength of the wheelsets and parts thereof. It also achieves very good sound-deadening.

It has moreover been found that the coating compositions according to the invention are self-extinguishing within 4 seconds in flammability tests from DIN 5510, and that no constituents form flaming drops.

The coating compositions according to the invention moreover reveal any potential hot-running of the coated wheelsets by virtue of a clearly visible scorching color at temperatures above 280° C.

The coating obtained by using the coating compositions of the invention in principle permits non-destructive ultrasound testing.

In the event that removal of the coating is desired, this can be achieved by using high-pressure water jets. In contrast with abrasive blasting, an undamaged surface is retained, and the coating does not produce any contaminated blasting material requiring complicated disposal.

The very good sound-deadening is in particular apparent in noise emissions reduced by up to 2.4 dB(A).

EXAMPLE

A component A was produced via mixing of the following constituents in the quantitative proportions stated:

| Component A | |
|---|---|
| Substance | Amount |
| Branched polyether polyol (CARADOL ® ET380-02, Shell Chemicals) | 21.400 |
| Castor oil | 42.530 |
| Diethyltoluenediamine (ETHACURE ® 100 Curative (ALBEMARLE Corporation)) | 0.670 |
| Phenol-modified hydrocarbon resin (NOVARES ® LA 700, Rütgers Chemicals) | 16.200 |
| Zeolite | 5.000 |
| Trizinc bis(orthophosphate) | 6.300 |
| Zinc oxide | 2.450 |
| Dibutyltin dilaurate | 0.250 |
| Iron oxide | 0.700 |
| Titanium oxide | 0.150 |
| Iron(III) oxide | 2.200 |
| Additives: | |
| Commercially available antifoam | 1.000 |
| Commercially available leveling additive | 1.150 |

Abovementioned component A was mixed in a 2C airless hot-spray system with diphenylmethane 2,4-/4,4-diisocyanate as component B in a ratio by weight of A:B=2.5:1, and applied to wheelsets. Dry film thickness was 2500 micrometers (Example 1a).

Wheelsets were moreover coated as in example 1a, where the wheelsets were coated with 25 micrometers of OLD-OPDX® ZM as adhesion promoter before the two-component polyurethane coating composition was applied; the coating with the two-component polyurethane coating composition was carried out while the material could still be overcoated in accordance with the technical instructions (Example 1b).

A TSI Noise sound measurement carried out on the wheelsets coated according to Example 1b revealed noise emission reduced by 2.4 dB(A).

The invention claimed is:

1. Wheelsets for trackbound vehicles or parts of these, said wheelsets comprising a cured coating produced from a 2-component polyurethane coating material, characterized in that the coating has been produced via application and curing of a coating composition comprising:
   a component A comprising
      a1) from 18 to 30% by weight of a polyether polyol with a hydroxy number of from 300 to 500 mg KOH/g, determined to ASTM D1209,
      a2) from 38 to 60% by weight of castor oil,
      a3) from 0.6 to 2.0% by weight of at least one di- or polyamine,
      a4) from 5.6 to 9.0% by weight of trizinc bis(orthophosphate),
      a5) from 2.2 to 3.5% by weight of zinc oxide and/or zinc phosphate,
      a6) from 0.05 to 0.4% by weight of a catalyst which catalyzes urethane formation, where the percentage by weight data are based on the total mass of the coating composition, and
   a component B comprising one or more di- and/or polyisocyanates in an amount which corresponds to a molar ratio of from 0.6:1 to 1.2:1 of the isocyanate groups to the hydroxy groups of the constituents a1) and a2).

2. The wheelsets or parts of these of claim 1, characterized in that the coating composition comprises, as further constituent of component A,
   a7) from 14.5 to 17.5% by weight of a copolymer of unsaturated aromatic $C_9/C_{10}$-hydrocarbons with phenol.

3. The wheelsets or parts of these of claim 1, characterized in that the coating composition comprises, as further constituent of component A,
   a8) from 3.5 to 6.5% by weight of zeolite.

4. The wheelsets or parts of these of claim 1, characterized in that the coating composition comprises, as further constituent of component A,
   a9) from 2.5 to 6.5% by weight of pigments and/or fillers.

5. The Wheelsets or parts of these of claim 1, characterized in that the coating composition comprises, as further constituent of component A,
   a10) from 2 to 2.5% by weight of antifoam and/or leveling assistant.

6. The wheelsets or parts of these of claim 1, characterized in that component B) comprises diphenylmethane 2,4- and/or 4,4-diisocyanate.

7. The wheelsets or parts of these of claim 1, characterized in that the catalyst a6) comprises dibutyltin dilaurate.

8. A process for coating wheelsets or parts thereof, comprising applying to a metal surface of the wheelset 2-component polyurethane coating composition, the applied coating composition comprising:
   a component A comprising
      a1) from 18 to 30% by weight of a polyether polyol with a hydroxy number of from 300 to 500 mg KOH/g, determined to ASTM D1209,
      a2) from 38 to 60% by weight of castor oil,
      a3) from 0.6 to 2.0% by weight of at least one di- or polyamine,
      a4) from 5.6 to 9.0% by weight of trizinc bis(orthophosphate),
      a5) from 2.2 to 3.5% by weight of zinc oxide and/or zinc phosphate,
      a6) from 0.05 to 0.4% by weight of a catalyst which catalyzes urethane formation, where the percentage by weight data are based on the total mass of the coating composition, and
   a component B comprising one or more di- and/or polyisocyanates in an amount which corresponds to a molar ratio of from 0.6:1 to 1.2:1 of the isocyanate groups to the hydroxy groups of the constituents a1) and a2),
   and curing the applied coating composition on the metal surface of the wheelset.

9. The process of claim 8, characterized in that the coating composition comprises, as further constituent of component A
   a7) from 14.5 to 17.5% by weight of a copolymer of unsaturated aromatic $C_9/C_{10}$-hydrocarbons with phenol.

10. The process of claim 8, characterized in that the coating composition comprises, as further constituent of component A,
    a8) from 3.5 to 6.5% by weight of zeolite.

11. The process of claim 8, characterized in that the coating composition comprises, as further constituent of component A,
    a9) from 2.5 to 6.5% by weight of pigments and/or fillers.

12. The process of claim 8, characterized in that the coating composition comprises, as further constituent of component A,
    a10) from 2 to 2.5% by weight of antifoam and/or leveling assistant.

13. The process of claim 8, characterized in that component B) comprises diphenylmethane 2,4- and/or 4,4-diisocyanate.

14. The process of claim 8, characterized in that the catalyst a6) is dibutyltin dilaurate.

15. The process of claim 8, further comprising applying at least one adhesion primer to the metal surface before the coating composition is applied.

\* \* \* \* \*